3,168,407
FUNGUS RESISTANT BONDED CORK
Gerald Ernest Hamor Skrimshire and Elizabeth Joan Hooke, both of London, England, assignors to The British Drug Houses Limited
No Drawing. Filed Mar. 15, 1962, Ser. No. 180,038
Claims priority, application Great Britain Mar. 15, 1961
9 Claims. (Cl. 106—15)

This invention relates to a method for the preparation of fungus resistant bonded cork.

It is an object of the invention to provide a method for the prevention of fungal growths on bonded cork.

It is a further object of the invention to provide bonded cork mould-proofed by the process of the invention.

It is well-known that articles prepared from resin or glue-bonded cork, especially the latter, are subject to attack by moulds.

It is also known that it is very difficult to mould-proof cork and that many substances which are highly potent anti-fungal agents in other fields, e.g., that of textiles, are of little use for this purpose. (See Sigmund Berk, Ind. Eng. Chem. 262, 1948: 627, 1949.)

It has been suggested that the lack of effectiveness is due partly to the nature of the bonding agent, particularly glue, which acts as a nutrient for the growth of moulds and partly to the non-substantivity to cork of the majority of known fungicides.

In addition to providing effective protection against mould growth, a good fungicide for bonded cork should satisfy a number of requirements. In particular it should cause no deterioration of the treated material, or corrode metals with which the latter comes into contact. It should be stable at elevated temperatures and not be easily leached out by water or affected by sunlight. For many purposes, a low toxicity to humans is also desirable.

In addition to the above requirements, it would be greatly advantageous if the fungicide could be incorporated during the bonding process, thus avoiding subsequent processing of the formed cork. This last requirement has not hitherto been met, inter alia because the conditions of bonding (heating the cork granules for some hours with, e.g., paraformaldehyde, glue and glycerine) are such as to result in chemical alteration of the fungicide, particularly if the latter is of phenolic nature.

We have now found that when incorporated into bonded cork the effect of magnesium dehydroacetate as an anti-fungal agent is altogether surprising. While dehydroacetic acid and its soluble salts are known anti-fungal agents, their activity when incorporated with bonded cork is poor compared with that of the sparingly soluble magnesium salt. Moreover, the other Group II metal salts, sparingly soluble in water like the magnesium salt, i.e., the calcium and cadmium salts, have been investigated by us and have been found to possess little useful activity as will be seen by comparative examples set forth hereafter.

According to the present invention therefore there is provided a method for the production of fungus resistant bonded cork which comprises incorporating with cork granules a bonding mixture and a proportion of magnesium dehydroacetate, compressing and heating the resulting mass. The bonding mixture may comprise either a synthetic resin, such as a formaldehyde resin or a glue, and a substance, such as paraformaldehyde or hexamine, which under the conditions of the bonding process will yield formaldehyde, and a polyhydric alcohol such as glycerol or diethyleneglycol. The magnesium dehydroacetate may be incorporated simultaneously with the other ingredients of the bonding mixture or alternatively in the form of a premix with the synthetic resin or glue. The proportion of magnesium dehydroacetate is preferably between 1 and 2% by weight of the cork granules.

Magnesium dehydroacetate is 0.07% soluble in water at 20° C. and is not therefore easily leached out from the finished article and is stable at elevated temperatures. It is colourless, stable to light, non-corrosive and has a low toxicity for humans.

Following is a description by way of example of methods of carrying the invention into effect.

EXAMPLE 1

1.5 g. of magnesium dehydroacetate, prepared by treating a solution of sodium dehydroacetate with the calculated quantity of magnesium sulphate, filtering the precipitated magnesium salt and drying (Collie and Le Seur, J.C.S. 65, 260, 1894) was mixed with 22.5 g. of glycerol, 12 g. glue and 1.12 g. paraformaldehyde. The mixture was then incorporated with 112 g. cork granules, the mass compressed and heated for 8 hours at 127° C.

Another sample of bonded cork was prepared containing 1% of calcium dehydroacetate together with others containing 1% of the following known antifungal substances—

Bis-(5 chloro-2-hydroxyphenyl)methane (Dichlorophene)
Bis-(3,5,6 trichloro-2-hydroxyphenyl)methane (Hexachlorophene)
2,3 dichloro-1,4-naphthoquinone Slices of the samples were then placed on slides, and inoculated with spores of the following fungi—

*Chaetomium globosum*
*Trichoderma viride*
*Aspergillus niger*

The slides were then placed in Petri dishes lined with moist filter paper, covered and allowed to incubate for 10 days at room temperature. Table I records the results:

*Table I*

| Organism | Magnesium dehydroacetate | Calcium dehydroacetate | Dichlorophene | Hexachlorophene | Dichloronaphthoquinone | Control |
|---|---|---|---|---|---|---|
| *Chaetomium globosum* | − − | S S | + + | + + | − + | + + |
| *Aspergillus niger* | − − | + + | + + | + + | + + | + + |
| *Trichoderma viride* | −* −* | + + | + + | + + | + + | + + |
| Uninoculated | − − | − − | − − | − − | − − | − − |

+ indicates growth of inoculum.
− indicates no growth of inoculum or no growth on the uninoculated material.
S indicates slight growth of inoculum.
* after a further 14 days incubation there was growth with this organism.

EXAMPLE 2

Further samples of bonded cork were prepared containing separately dehydroacetic acid, the calcium salt, magnesium salt and cadmium salt at various levels.

3% malt agar was melted and allowed to cool to 45° C. A heavy spore suspension of *Aspergillus niger* was added and plates poured. When the agar had set, slices cut from the cork samples were placed on the surface and the plates incubated at 30° C. for 2 days.

*Table II*

| Percent | Magnesium dehydroacetate | Calcium dehydroacetate | Cadmium dehydroacetate | Dehydroacetic acid |
| --- | --- | --- | --- | --- |
| 1.0 | − − − | +++ +++ +++ | − + + | ++ ++ + |
| 0.5 | + + + | ++++ ++++ ++++ | +++ +++ +++ | +++ ++++ ++++ |
| 0.25 | ++ ++ ++ | ++++ ++++ ++++ | +++ +++ +++ | ++++ ++++ ++++ |
| 0.10 | ++ ++ +++ | ++++ ++++ ++++ | ++++ ++++ ++++ | ++++ ++++ ++++ |

Control ++++ ++++ ++++.
− no growth within ¼″ of cork and ¼″ non-sporing zone.
+ no growth within 1 mm. of cork and ¼″ non-sporing zone.
++ growth up to cork, but no sporing within ¼″ of cork.
+++ growth up to cork, but slight inhibition of sporing up to 1 mm. of cork.
++++ growth and sporing up to cork.

The zones of partial or complete inhibition shown by this test may be regarded as the resultant effect of two properties, (1) the antifungal activity developed by the substance in the cork and (2) diffusibility of the substance which is largely determined by its solubility in water.

The solubilities of the four substances at 20° C. (except in the case of the free acid which is at 6° C.) are as follows:

| | Percent |
| --- | --- |
| Dehydroacetic acid | 1.0 |
| Calcium salt | 0.33 |
| Cadmium salt | 0.10 |
| Magnesium salt | 0.07 |

Since this is the reverse order from that of the inhibitory effect it may be concluded that the table indicates qualitatively the relative antifungal potencies of the four substances when incorporated into cork.

EXAMPLE 3

Samples of bonded cork were prepared containing 2.0%, 1.0% and 0.5% of magnesium dehydroacetate. The samples were attached to nylon threads, inoculated with various organisms either by dipping in a spore suspension or by application of a fragment of mycelium and suspended in screw-capped bottles containing some water. The samples were examined after 1 month at room temperature.

In addition to controlling 12 out of 14 of the organisms used, 2% magnesium dehydroacetate also prevents growth of the normal contaminants of the cork as indicated by the absence of the symbol (+) in the right-hand column.

EXAMPLE 4

100 g. of cork granules was incorporated with a mixture of 11.0 g. diethylene glycol, 11.0 g. phenolformaldehyde resin and 1.17 g. magnesium dehydroacetate by warming and stirring and the product compressed and heated at 127° C. for six hours. Another preparation (control) was made in the same way but omitting the magnesium dehydroacetate. Samples were cut from the bonded masses attached to nylon threads and inoculated with the following fungi:

*Aspergillus niger*
*Stemphylium languinosum*
*Chaetomium globosum*

In the case of the first two, the samples were dipped in aqueous spore suspensions of the fungi. With *Chaetomium globosum*, one parathecium was applied to the surface of the cork. The samples were then suspended over water in screw-capped bottles and observed after one month at room temperature.

*Table IV*

| Sample | A. niger | S. languinosum | C. globosum |
| --- | --- | --- | --- |
| With 1% magnesium dehydroacetate | − − − | − − − | − − − |
| Control | ∓ − − | − − − | − − − |
|  | (+) + + | + + + | + + − |

+ Growth of test organism.
∓ Slight growth of test organism.
(∓) Slight growth of contaminating organism.
− No growth.

*Table III*

| Organism | Control | 0.5% | 1.0% | 2.0% |
| --- | --- | --- | --- | --- |
| Alternaria sp. | + + + | (+) + + | − − − | − − − |
| Aspergillus flavus | + + | + + | + + | + + |
| Aspergillus niger | + + | + + | − − | − − |
| Ceratocystis pilifera | (+) (+) (+) | (+) − − | − − − | − − − |
| Chaetomium globosum | + + + | − − − | − − − | − − − |
| Coniophora cerebella | (+) (+) | (+) − | − − | − − |
| Cladosporium herbarum | (+) (+) | (+) − | (+) − | − − |
| Geotrichum sp. | + + | + (+) | + − | − − |
| Penicillium citrinum | + + + | + + + | − − − | − − − |
| Penicillium frequentans | + + | | | |
| Rhizopus nigricans | (+) + + | (+) (+) (+) | (+) (+) (+) | − − − |
| Sproendonema | + + + | + + − | − − − | − − − |
| Stemphylium languinosum | + + + | + + − | − − − | − − − |
| Trichoderma viride | + + | + + | + + | + + |
| Uninoculated controls | (+) (+) | (+) − | − − | − − |

+ Growth of Inoculum.   (+) Growth of contaminants.   − No growth.

EXAMPLE 5

15 g. of an intimate mixture of 12 g. glue with 3 g. of magnesium dehydroacetate was mixed with 22.5 g. glycerol and 1.12 g. paraformaldehyde and the product incorporated with 111 g. cork granules. The mass was then compressed and heated for 8 hours at 127° C.

A control sample was also prepared omitting the magnesium dehydroacetate.

Slices of the two samples were taken and treated in the following manner.

A. Three slices from each sample were treated separately with 2 drops of three spore suspensions prepared from the fungi named below and suspended over water in screw-capped bottles. After standing at room temperature for 10 days the test and control samples were examined for relative growth.

B. Slices of the cork were placed on glass slides in Petri dishes and then inoculated by brushing with the respective fungus. The samples were kept at room temperature for 10 days and compared as before.

Test organisms:
  *Aspergillus niger*
  *Penicillium frequentans*
  *Trichoderma viride*

All the samples containing the magnesium dehydroacetate showed no growth of the organisms; the controls grew strongly.

We claim:
1. A method for the production of fungus resistant bonded cork which comprises incorporating with cork granules a bonding mixture and a minor but effective proportion of magnesium dehydroacetate to impart antifungal properties thereto, compressing and heating the resulting mass.
2. A method as claimed in claim 1 wherein the cork is glue-bonded.
3. A method as claimed in claim 1 wherein the cork is resin-bonded.
4. A method as claimed in claim 1 wherein the magnesium dehydroacetate is incorporated with the bonding mixture before adding to the cork granules.
5. A method as claimed in claim 1 wherein the proportion of magnesium dehydroacetate is between 1 and 2% by weight of the cork granules.
6. Fungus resistant bonded cork containing therein a minor but effective proportion of magnesium dehydroacetate to impart antifungal properties thereto.
7. A preparation for the production of fungus resistant cork comprising a bonding mixture incorporating a minor but effective proportion of magnesium dehydroacetate.
8. A method as claimed in claim 1 in which there is incorporated from 0.1 to 2.0% by weight of magnesium dehydroacetate.
9. A product as claimed in claim 6 which contains from 0.1 to 2.0% by weight of magnesium dehydroacetate.

References Cited in the file of this patent

UNITED STATES PATENTS

| | | |
|---|---|---|
| 2,316,371 | Strother | Apr. 13, 1943 |
| 2,567,010 | Coleman et al. | Sept. 4, 1951 |
| 2,722,483 | Winkler | Nov. 1, 1955 |
| 2,868,773 | Kress | Jan. 13, 1959 |

FOREIGN PATENTS

| | | |
|---|---|---|
| 687,735 | Great Britain | Feb. 18, 1953 |

OTHER REFERENCES

"Journal of American Chem. Society," vol. 65, 1894, pp. 254–262.

"Journal of Pharmacology and Experimental Therapeutics," vol. 9, 1950, pp. 57–68.